July 6, 1965    R. C. HANSEN    3,193,093
SHIPPING RACK FOR SHEET MATERIALS
Filed March 4, 1963    2 Sheets-Sheet 2
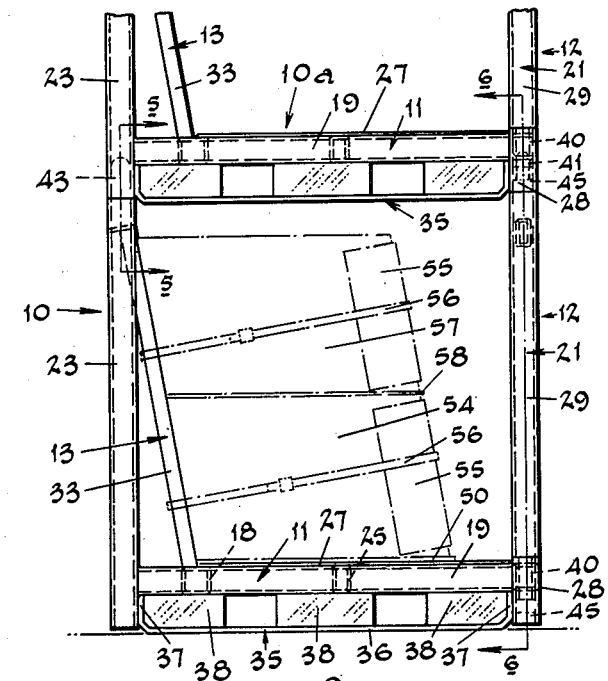
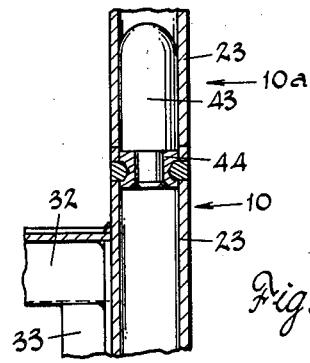
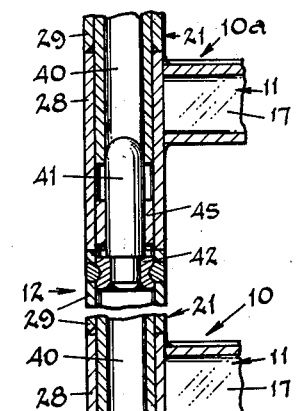
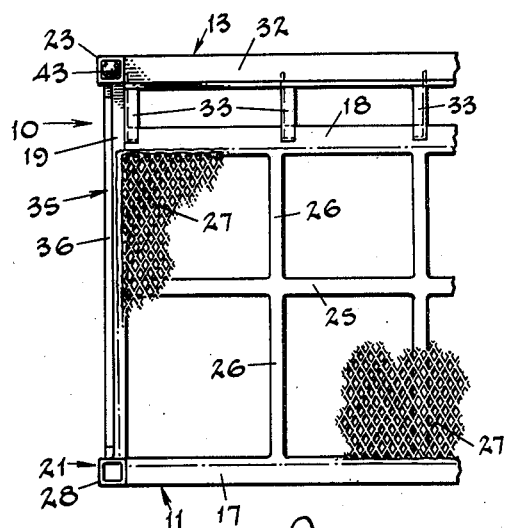
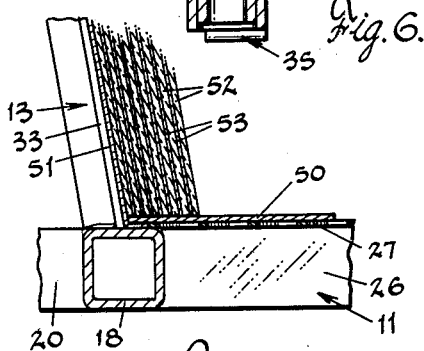
INVENTOR.
Ralph C. Hansen
BY
Nobbe & Swope
ATTORNEYS

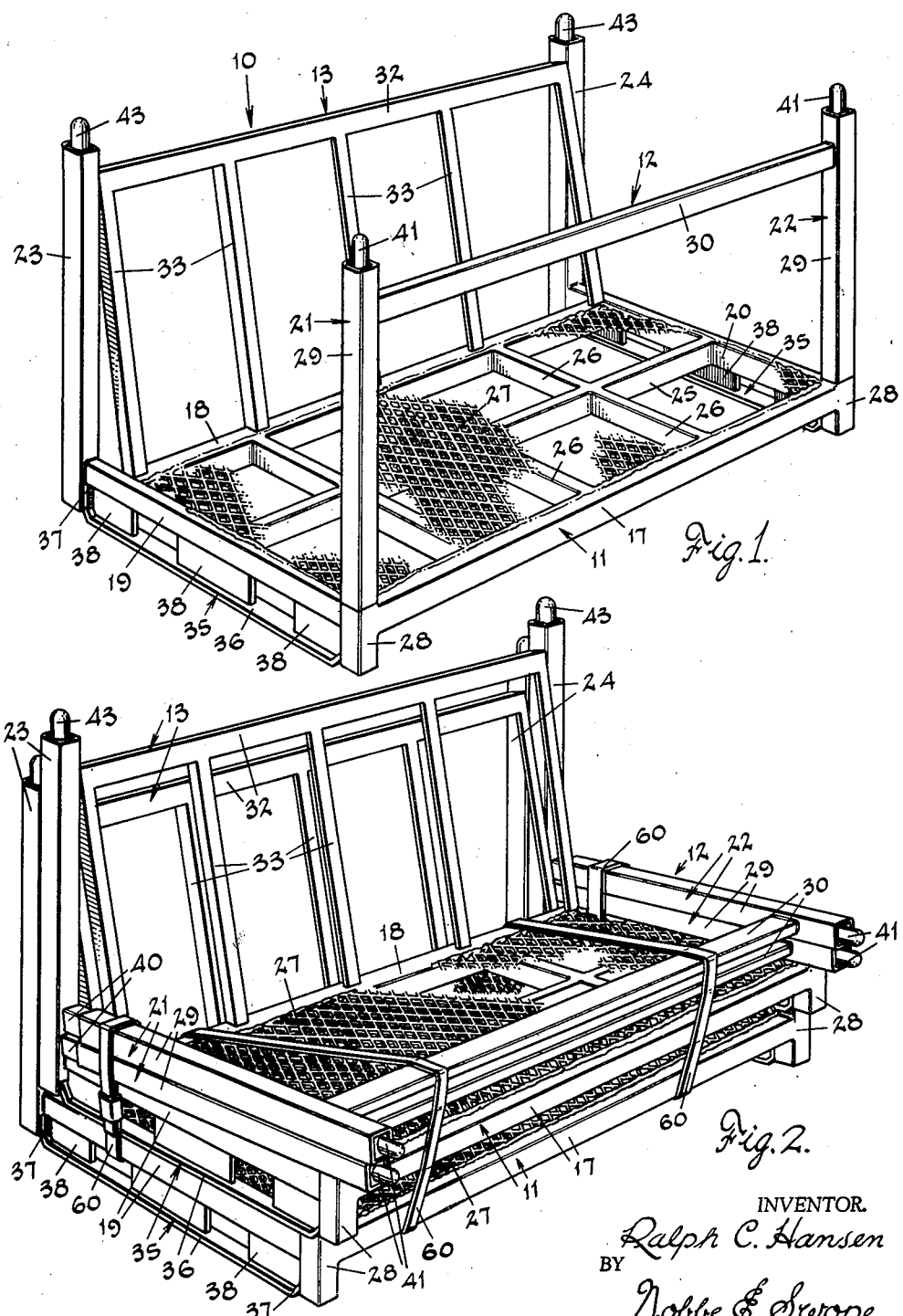

United States Patent Office 3,193,093
Patented July 6, 1965

3,193,093
SHIPPING RACK FOR SHEET MATERIALS
Ralph C. Hansen, Toledo, Ohio, assignor to Libbey-Owens-Ford Glass Company, Toledo, Ohio, a corporation of Ohio
Filed Mar. 4, 1963, Ser. No. 262,485
9 Claims. (Cl. 206—62)

The present invention relates broadly to the transporting of sheet materials such as sheets or plates of glass and the like and more particularly to an improved rack on which sheets or plates of glass can be economically shipped and stored.

An important object of this invention is to provide a shipping rack which is adapted to safely carry a relatively large number of glass sheets or plates during the transportation and/or storage thereof.

Another object of the invention is to provide a shipping rack of the above character having means for rigidly stacking one rack loaded with sheets or plates of glass upon a second similarly loaded rack.

Another object of the invention is to provide a shipping rack of the above character which is adaptable for stacking, when unloaded, with like empty racks for convenient return transportation.

A further object of the invention is to provide a shipping rack of the above character of rigid, durable structure whereby the normally expected expense of maintenance and replacement is reduced to a minimum.

Other objects and advantages of the invention will become more apparent during the course of the following description when read in connection with the accompanying drawings.

In the drawings, wherein like numerals are employed to designate like parts throughout the same:

FIG. 1 is a perspective view of a shipping rack constructed in accordance with the present invention;

FIG. 2 is a perspective view of two empty shipping racks arranged in nesting relation;

FIG. 3 is a side view of two shipping racks in stacked relation as during the storage thereof with sheet materials;

FIG. 4 is a fragmentary plan view of a shipping rack;

FIG. 5 is a cross-sectional detail view taken on line 5—5 of FIG. 3;

FIG. 6 is a similar detail view taken on line 6—6 of FIG. 3; and

FIG. 7 is a fragmentary detail view of a partially loaded shipping rack.

Briefly stated, the shipping rack of this invention is particularly adapted for repeated use in the transportation of sheets or plates of glass or similar materials with a resulting saving to both the supplier and the user. Sheets or plates of glass, which are susceptible to both edge chipping and surface scratching, have in many instances been packaged in disposable light wooden boxes or corrugated paper cartons to protect them from damage. When, however, such glass is transported more or less directly to sources of use or for further fabrication, such as in the building trades or to the producers of mirror articles, the cost and ultimate disposal of the empty boxes or cartons proves to be a costly and time-consuming problem. Moreover, the structural strength of the thin wooden boxes or paper cartons is not particularly adapted for stacking of the same with assured safety of the glass while in storage. As herein contemplated, the shipping rack of this invention is designed to carry a relatively large number of sheets or plates of glass with a maximum degree of protection from breakage or other damage and requiring a minimum amount of protective material. Additionally, the construction of the shipping rack is such that it can be readily and safely arranged in stacked relation with one or more other shipping racks.

Referring now to the drawings and particularly to FIG. 1, there is illustrated a shipping rack constructed in accordance with the invention and designated in its entirety by the numeral 10. As shown, the rack 10 comprises a horizontal supporting base 11, a substantially vertical front wall 12, and an inclined rear wall 13. More specifically, the base 11 consists of a substantially rectangular framework comprising horizontally disposed longitudinal front and rear rails 17 and 18, respectively and transversely disposed end rails 19 and 20 extending between and connecting said front and rear rails. Arranged at the four corners of the base are the vertically disposed corner posts 21, 22, 23 and 24. As viewed in FIGS. 1 and 4, it will be seen that the rear rail 18 is located inwardly of the rear ends of the end rails 19 and 20. Located between and extending in parallel relation to the front and rear rails 17 and 18 is an intermediate rail 25 connected to the said front and rear rails by a plurality of transverse bracing rails 26. The actual deck or supporting surface of the base 11 preferably consists of a sheet of expanded metal 27 carried by the rails 25 and 26 and secured along its edges to the front and rear rails 17 and 18 and end rails 19 and 20. The deck 27 can, of course, be formed of a solid sheet material if desired; however, the more open formation of the expanded metal reduces the retention of moisture or accumulation of dirt on the exposed deck of an empty rack. In order to reduce the body weight of the shipping rack, the several rails and corner posts are preferably of tubular formation.

The corner posts 21 and 22 of the front wall 12 are arranged at the corners formed by the adjacent ends of the longitudinal front rail 17 and end rails 19 and 20 while the rear posts 23 and 24 are fixed to the ends of the respective end rails 19 and 20. The front corner posts 21 and 22 are each formed of two separable sections in order that the front wall 12 can be readily removed and replaced with reference to the base 11. Thus, each front corner post comprises a fixed lower section 28, integral with the base rail 17, and a removable upper section 29. When the lower and upper sections 28 and 29 of posts 21 and 22 are arranged in assembled relation, they are, of course, of the same height as the rear corner posts 23 and 24. A horizontal bracing rail 30 extends between and connects the upper sections 29 of the posts to complete the front wall 12.

The rear wall 13 is formed by a horizontally disposed angular member 32, secured at its ends to the rear corner posts 23 and 24 adjacent the upper ends thereof, with spaced vertical bars 33 connecting the member 32 to the rear longitudinal rail 18. Since the rail 18 is located inwardly of the rear corner posts 23 and 24 and the adjacent ends of the end rails 19 and 20, the bars 33 are located in angularly disposed relation between the rear rail 18 and member 32 to the end that the rear wall 13 is disposed in an upwardly and outwardly inclined plane against which the sheet material, such as sheets or plates of glass, can be safely stacked.

The supporting base 11 is provided at its opposite ends with metal runner members or bars 35 extending between the corner posts 21 and 23 and 22 and 24 for bodily supporting the rack on a floor surface, with the lowermost ends of the four corner posts being spaced slightly above the supporting surface. Each runner bar 35 is formed with a substantially flat center support portion 36 and upwardly directed end portions 37 secured to the respective end rail 19 or 20 as well as to the inwardly directed surfaces of the respective posts 21 and 23 or 22 and 24. Vertically disposed reinforcing plates 38 are preferably secured between the bars 35 and end rails 19 and 20 and are suitably spaced from one another to provide openings for the reception of the fork of a conventional lift truck.

The front wall 12 is located and supported on the base 11, as shown in FIGS. 1 and 3, by means of aligning elements fixed in the lower ends of removable sections 29 of the posts 21 and 22 and adapted to be received in the open upper fixed sections 28. For this purpose, an aligning element or tubular sleeve 40 is fitted into the lower end of each section 29; each sleeve being of the same tubular cross-section as the post, and of such proportionately smaller dimension as to be freely slidable in the said section 28. The aligning sleeves 40 thus serve to rigidly support the front wall 12 on the base 11 of the rack, as shown in FIGS. 3 and 6.

In order to locate one rack above another in substantially rigidly stacked relation, the upper ends of the posts 21–24 are provided with so-called stacking pegs whereby the open lower ends of the upper rack posts can be located and maintained in mounted relation on the respective upper ends of the posts of the rack therebeneath. Thus, the upper end of each removable section 29 of the front wall posts 21 and 22 is equipped with a cylindrical round-ended peg 41 that is fixed in a block 42 secured in the said upper end of each section 29 as best seen in FIG. 6. In this respect, it will be noted that when a rack 10a is stacked, as in FIGS. 3 and 6, on a lower shipping rack 10, the pegs 41 are received in the lower ends of the aligning sleeves 40 associated with the front wall 12 of the upper rack. Consequently, the pegs 41 are of suitable diameter as to be freely inserted in said sleeves.

As viewed in FIGS. 1 and 5, the rear posts 23 and 24 are provided with pegs 43 at their upper ends to receive the lower ends of the corresponding posts of an upper rack when the racks are arranged in stacked relation. Each peg 43 is attached to a block 44 secured in the upper end of each post 23 and 24 and is of a diameter substantially equal to the inside dimension of the tubular post. This affords a relatively rigid mounting connection for the rear posts 23 and 24 as well as for the front posts 21 and 22 as above described.

Each fixed section 28 of the front posts 21 and 22 is additionally provided adjacent its lower end with an aligning sleeve or collar 45 as seen in FIG. 6. The collars 45 are of the same size as the aligning sleeves 40 so that, as viewed in this figure, a peg 41 readily passes through the collar 45 and is received within the adjacent end of a sleeve 40.

When the rack is to be loaded, the front wall 12 is removed and a sheet of packing material 50, such as corrugated paper board, is placed, as shown in FIG. 7, on the expanded metal deck 27 of base 11. A similar sheet 51 is also placed against the rear wall 13. The sheets or plates of glass 52 are then stacked on edge on the base 11 and against the rear wall and may be separated from one another in the usual manner to prevent surface scratching, by sheets of paper 53 or the like. As the loading of the sheets progresses, their weight serves to press the corrugated paper 50 downwardly into frictional engagement with the upper exposed edges of the expanded metal deck 27 to minimize any possibility of the material 50 to slip and dislodge the glass sheets from their stacked relation. When one group or stack 54 of glass sheets has been placed on the rack, a sheet of protective material 55 (FIG. 3) is placed against the outermost glass sheet and, after being folded around the edges thereof, is secured by banding material 56 which extends about the stack of sheets as well as the rear wall 13. A second group of sheets 57 can then be stacked in a similar manner upon a sheet of protective material 58, such as corrugated paper board, placed on the upper edges of the lower group of stacked sheets 54. The second group 57 is then secured in like manner by a protective sheet 55 and banding 56.

When a pair of shipping racks are to be arranged in stacked relation as in FIG. 3, the front wall 12 of the first shipping rack 10 is placed in position with the aligning sleeves 40 in the upper sections 29 of posts 21 and 22 being received in the lower sections 28 thereof. A second rack 10a is then located thereabove so that the lower ends of the front posts 21 and 22 will be aligned with the pegs 41 of the lower rack and the lower ends of the rear posts 23 and 24 similarly aligned with the pegs 43. Upon lowering the second rack 10a, the pegs 41 of the front corner posts 21 and 22 will be inserted through the locator collars 45 in the lower ends of the lower sections 28 of the front corner posts of the upper rack 10a and received in the aligning sleeves 40 thereof. At the same time, the open lower ends of the rear posts 23 and 24 of upper rack 10a will receive the pegs 43 at the upper ends of the rear corner posts 23 and 24 of the lower rack 10, as in FIG. 5.

When a number of shipping racks are to be returned to the source of supply, the structure of the racks adapts them for ready and convenient interfitting as shown in FIG. 2. In this connection, it will be noted that the rear posts 23 and 24 of one rack are received in the corners between the rear posts 23 and 24 and the end surfaces of the rear wall 13 of a lower rack. As well, the runner bars 35 of the top rack are carried by the end rails 19 and 20 of the lower rack. This can be repeated by the addition of one or more racks if desired. The front walls 12 are then laid up as shown in FIG. 2 with the removable upper sections 29 of each post 21 and 22 positioned one above the other on the side rails of the topmost shipping rack and this assemblage firmly secured together by banding straps 60.

It is to be understood that the form of the invention herewith shown and described is to be taken as a preferred embodiment of the same, and that various changes in the shape, size and arrangement of parts may be resorted to without departing from the spirit of the invention.

I claim:

1. A shipping rack for sheets or plates of glass, comprising a rectangular base including spaced front and rear longitudinal rails and end rails extending between and connecting said front and rear rails, said end rails extending beyond said rear longitudinal rail, vertical posts secured to said end rails beyond said rear longitudinal rail, and a vertically inclined rear wall extending between and carried by said posts at its upper end and connected to said rear longitudinal rail at its lower end.

2. A shipping rack for sheets or plates of glass as claimed in claim 1, including a vertical front wall removably carried by said base.

3. A shipping rack for sheets or plates of glass and the like as claimed in claim 2, in which said front wall comprises vertical corner posts and means connecting said corner posts together.

4. A shipping rack for sheets or plates of glass as claimed in claim 3, in which the front and rear corner posts are tubular; and pegs carried at the upper ends of said posts and adapted to be received in the lower ends of the respective corner posts of a second rack when placed upon said first rack.

5. A shipping rack for sheets or plates of glass as claimed in claim 1, including a support surface for said base formed of expanded metal.

6. A shipping rack for sheets or plates of glass, comprising a rectangular base including spaced front and rear longitudinal rails and end rails extending between and connecting said front and rear rails, said end rails extending beyond said rear longitudinal rail, vertical posts secured to the rear ends of said end rails, a vertically inclined rear wall extending between and carried by said posts at its upper end and connected to said rear longitudinal rail at its lower end, and a vertical front wall removably carried by said base.

7. A shipping rack for sheets or plates of glass as claimed in claim 6, in which said front wall comprises vertical corner posts and means connecting said corner posts together.

8. A shipping rack for sheets or plates of glass as claimed in clam 7, in which the front and rear corner posts are tubular, and pegs carried at the upper ends of said posts and adapted to be received in the lower ends of the respective corner posts of a second rack when placed upon said first rack.

9. A shipping rack for sheets of frangible material, comprising a rectangular base including spaced front and rear longitudinal rails and end rails extending between and connecting said front and rear rails, said end rails extending beyond said rear longitudinal rail, vertical posts secured to said end rails beyond said rear longitudinal rail, a vertically inclined rear wall extending between and carried by said posts at its upper end and connected to said rear longitudinal rail at its lower end, a plurality of sheets supported on edge on said rectangular base and leaning against said vertically inclined rear wall, and a banding strap encircling said plurality of sheets and said rear wall substantially perpendicular to said rear wall and urging said sheets against said rear wall.

References Cited by the Examiner
UNITED STATES PATENTS

| | | | |
|---|---|---|---|
| 1,836,362 | 12/31 | Crowley | 211—41 |
| 2,046,045 | 6/36 | Shaw | 108—53 X |
| 2,530,752 | 11/50 | Arthur | 108—53 |
| 2,579,685 | 12/51 | Loose | 108—53 |
| 2,632,567 | 3/53 | Richtmyer | 108—55 X |
| 2,676,776 | 4/54 | Townson | 108—53 |
| 2,700,520 | 1/55 | Skubic | 108—53 |
| 2,728,544 | 12/55 | Ayre et al. | 108—53 |
| 2,839,198 | 6/58 | Lefenre | 211—41 |
| 2,863,566 | 12/58 | White et al. | 211—41 |
| 2,924,340 | 2/60 | Barto | 108—53 |
| 2,994,500 | 8/61 | Fraser et al. | 108—53 |

FOREIGN PATENTS 879,922   10/61   Great Britain.

FRANK B. SHERRY, *Primary Examiner.*